United States Patent
Nishida (10) Patent No.: US 11,279,268 B2
(45) Date of Patent: Mar. 22, 2022

(54) VEHICLE SEAT

(71) Applicant: Tachi-S Co., Ltd., Tokyo (JP)

(72) Inventor: Tsunaki Nishida, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 16/361,348

(22) Filed: Mar. 22, 2019

(65) Prior Publication Data
US 2019/0291612 A1    Sep. 26, 2019

(30) Foreign Application Priority Data

Mar. 22, 2018    (JP) .............................. JP2018-055203

(51) Int. Cl.
*B60N 2/28*    (2006.01)
*B60N 2/60*    (2006.01)

(52) U.S. Cl.
CPC ......... *B60N 2/2893* (2013.01); *B60N 2/6018* (2013.01)

(58) Field of Classification Search
CPC .... B60N 2/2887; B60N 2/289; B60N 2/2893; B60N 2/6018
See application file for complete search history.

(56) References Cited

U.S. PATENT DOCUMENTS

| | | | |
|---|---|---|---|
| 5,139,311 A * | 8/1992 | Imai ......................... | B60R 22/02 297/481 |
| 7,281,763 B1 * | 10/2007 | Hayashi ............... | B60N 2/2893 297/253 |
| 8,740,309 B2 * | 6/2014 | Kajihara .................. | B60N 2/58 297/481 |
| 9,340,128 B2 * | 5/2016 | Arai ...................... | B60N 2/2887 |
| 9,981,581 B2 * | 5/2018 | Okuhara .............. | B60N 2/2887 |
| 10,052,980 B2 * | 8/2018 | Konrad ................ | B60N 2/2893 |
| 10,189,382 B2 * | 1/2019 | Sammons ............ | B60N 2/2893 |
| 10,414,298 B2 * | 9/2019 | Shibuya ............... | B60N 2/6009 |

FOREIGN PATENT DOCUMENTS

| | | |
|---|---|---|
| JP | H03-075062 U | 7/1991 |
| JP | 2001-277920 A | 10/2001 |
| JP | 2017-071355 A | 4/2017 |

OTHER PUBLICATIONS

Japanese Office Action in JP App No. 2018-055203 dated Apr. 23, 2021.

* cited by examiner

*Primary Examiner* — Philip F Gabler
(74) *Attorney, Agent, or Firm* — Morgan, Lewis & Bockius LLP (57) ABSTRACT

A vehicle seat has a seating part and a seat back. The seating part and the seat back define a gap therebetween and the gap is formed on the front face of the vehicle seat. A recessed opening is formed on the front face of the vehicle seat on a side of the seating part relative to the gap, and the recessed opening has an anchor to which a child safety seat is anchored. The vehicle seat has a flat, plate-like cover member that is provided on the front face of the vehicle seat and is capable of covering the opening. The cover member has a base-end portion fixed to the vehicle seat and a free-end portion that is not fixed to the vehicle seat and can be freely inserted into the gap. A hard plate is provided in the free-end portion of the cover member.

7 Claims, 10 Drawing Sheets

VEHICLE SEAT

CROSS-REFERENCES TO RELATED APPLICATIONS

This application relates to and claims priority from Japanese Patent Application No. 2018-055203, filed on Mar. 22, 2018, the entire disclosure of which is incorporated herein by reference.

BACKGROUND

Field

The present invention relates to a vehicle seat.

Description of Related Art

There are vehicle seats equipped with anchors used for anchoring a child safety seat to the vehicle seat. In some of the vehicle seats of this type, a cover material is provided for covering an opening having an anchor provided therein (see JP2001-277920 A). When attaching a child safety seat to such seat, the opening is uncovered by taking the cover material off the opening and laying the material on the seating surface of the seat.

In the above-described vehicle seat, however, when the cover material is laid on the seating surface of the seat to attach a child safety seat, the edge of such laid cover material may turn up or bend so that the cover material can be uneven. Such cover material interferes with the process of anchoring the child safety seat, making it difficult to insert the fixation part of the child safety seat into the anchor. As a consequence, it becomes difficult to attach the child safety seat to the vehicle seat.

SUMMARY

The present invention has been made in view of the above-described circumstances. An object of the present invention is to provide a vehicle seat capable of making improvements in relation to the attachment of a child safety seat to the vehicle seat, while having a cover member for covering an opening with an anchor provided therein.

A vehicle seat according to an aspect of the present invention comprises: a seating part; a seat back, wherein the seating part and the seat back define a gap therebetween, the gap being formed on a front face of the vehicle seat, and wherein a recessed opening is formed on the front face of the vehicle seat on a side of the seating part relative to the gap, the recessed opening having an anchor to which a child safety seat is anchored; and a flat, plate-like cover member provided on the front face of the vehicle seat and capable of covering the opening. The cover member has a base-end portion that is fixed to the vehicle seat and a free-end portion that is not fixed to the vehicle seat and can be freely inserted into the gap between the seating part and the seat back, and a hard plate is provided in the free-end portion of the cover member.

According to the above aspect of the present invention, since a hard plate is provided in the free-end portion of the cover member, such hard plate prevents or reduces a turning-up or a bend that would otherwise occur in the edge of the cover member. Accordingly, the cover member is prevented from interfering with the process of attaching a child safety seat to the vehicle seat, or such interfering action of the cover member is reduced, and this leads to an improvement in the attachment of a child safety seat.

The above vehicle seat may be configured such that: the base-end portion of the cover member is fixed to the seating part at a portion forward of the opening; and the opening is covered with the cover member when the free-end portion is inserted into the gap between the seating part and the seat back, while the opening is uncovered when the free-end portion is taken out from the gap and the cover member is laid forward on the vehicle seat.

The cover member may have a further hard plate that is provided in the base-end portion of the cover member.

The further hard plate may be provided so as to be placed at a position corresponding to the opening when the free-end portion is inserted into the gap between the seating part and the seat back.

The base-end portion of the cover member may be fixed to the seat back at a portion above the gap between the seating part and the seat back, and the vehicle seat may be configured such that the opening is uncovered when the free-end portion is inserted into the gap between the seating part and the seat back, while the opening is covered with the cover member when the free-end portion is taken out from the gap and hangs down toward the opening.

The hard plate may be provided so as to be placed at a position corresponding to the opening when the free-end portion hangs down toward the opening.

The hard plate may be made of metal, and a magnet may be placed in the gap between the seating part and the seat back so that the hard plate can be attached to and detached from the magnet.

DETAILED DESCRIPTION

Hereinafter, preferred embodiments of the present invention will be described with reference to the attached drawings. It should be noted that the same elements will be given the same reference numerals and repetitive explanations will be omitted. Unless otherwise specified, the positional relationships, such as up-down and right-left relationships, are based on those shown in the drawings. The various dimensional ratios shown in the drawings are not limited to those in the drawings. In addition, the following embodiments are merely examples for describing the present invention and the present invention is not limited to the described embodiments.

Figure 1:
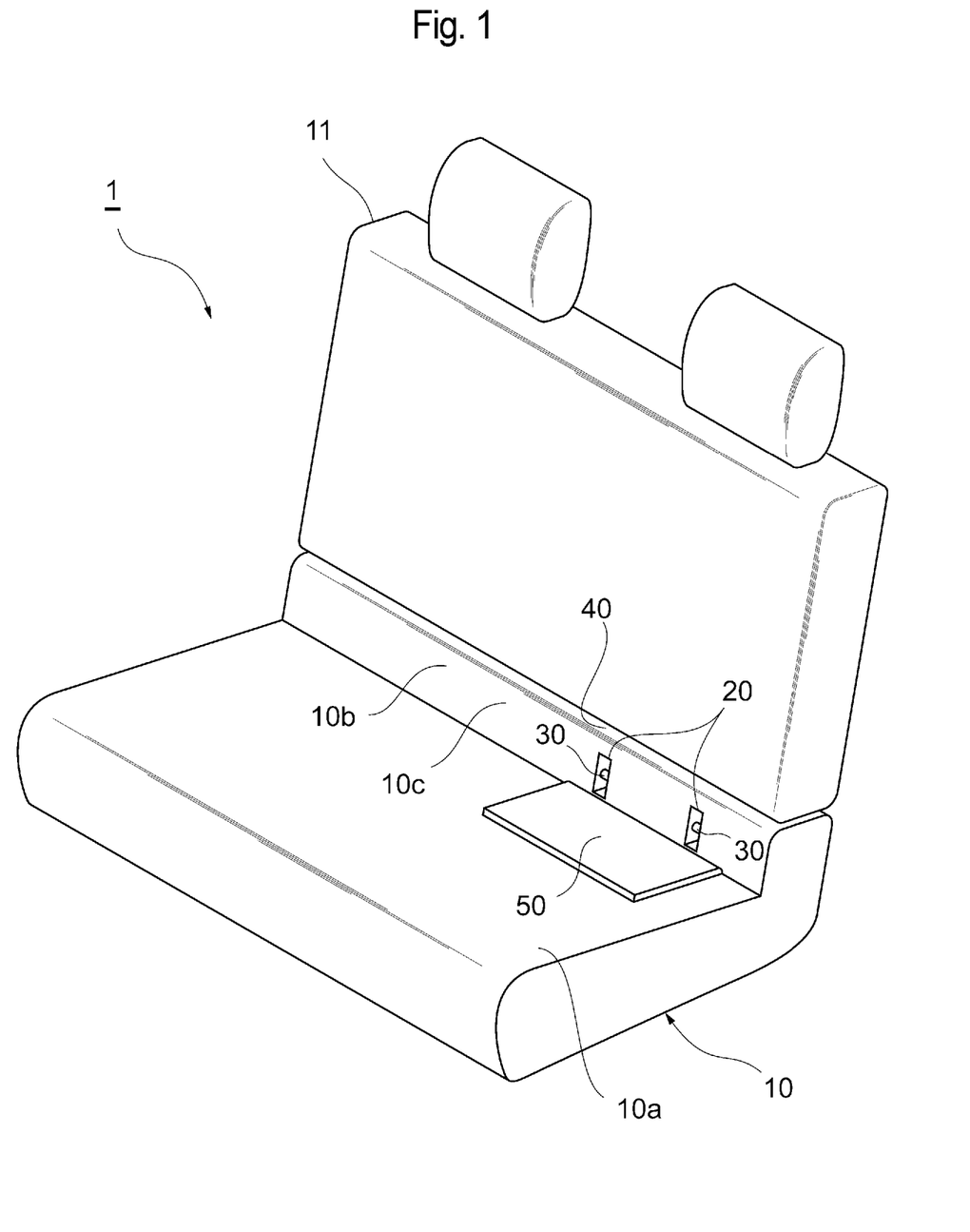
FIG. 1 is a perspective illustration showing an example of the configuration of a vehicle seat.

FIG. 1 is a perspective illustration showing an example of the configuration of a vehicle seat 1 according to this embodiment. For example, the vehicle seat 1 may comprise a seating part 10 on which a person sits, and a seat back 11 against which the sitting person leans. The seating part 10 and the seat back 11 each have a pad formed therein and the pad defines the outer shape of the seating part 10 or the seat back 11. The seating part 10 and the seat back 11 also have a trim cover on the surface thereof.

Figure 2:
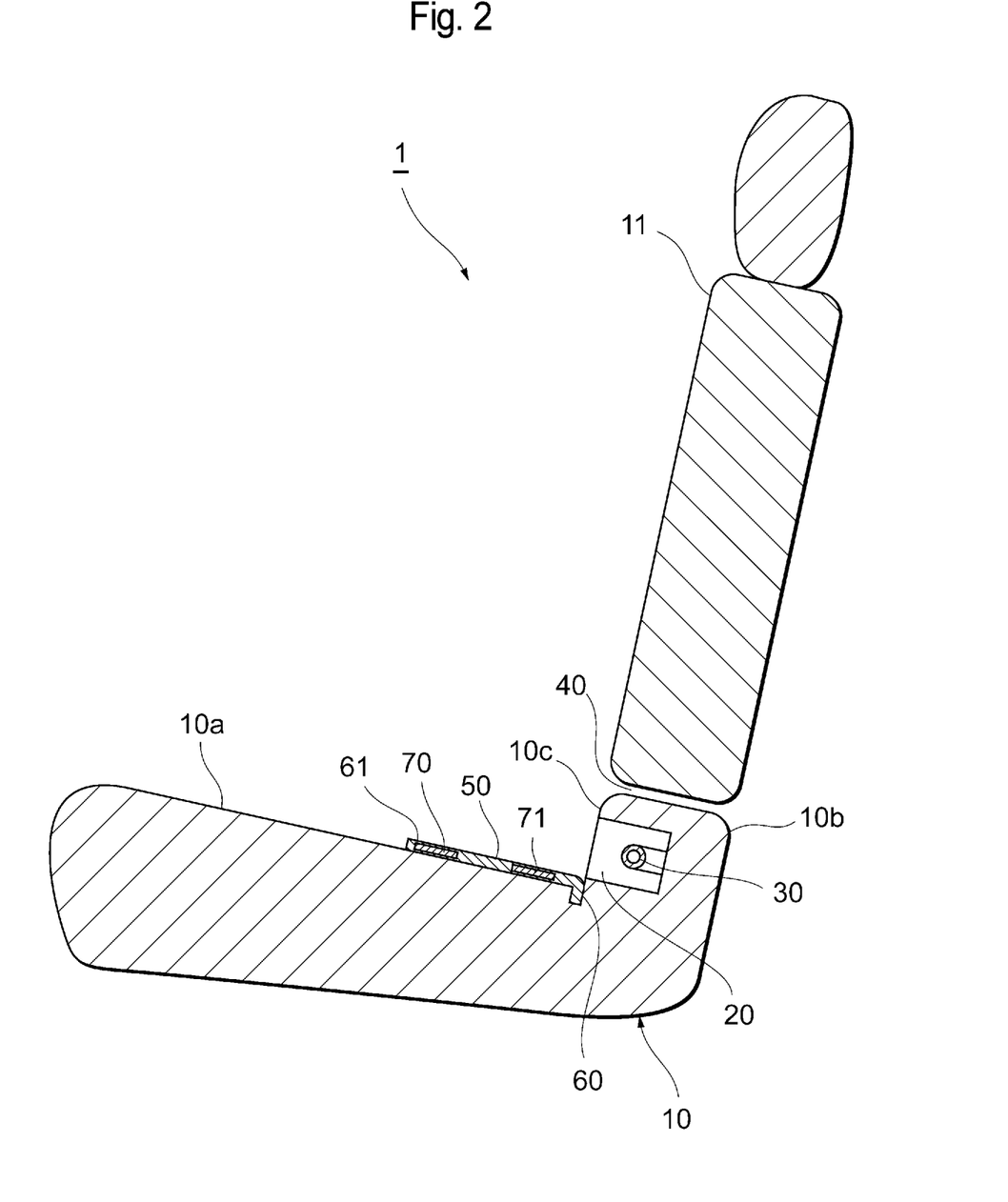
FIG. 2 is a schematic side view of a vehicle seat, illustrating the internal structure of the vehicle seat.

As shown in FIGS. 1 and 2, the seating part 10 has a flat part 10a and a ridged part 10b that protrudes above from the rear portion of the flat part 10a. The seating part 10 is in approximately L-shaped when seen from a side view. The ridged part 10b defines a seat wall 10c that faces forward at the rear portion of the seating part 10.

A recessed opening 20 is formed in the seat wall 10c. For example, two openings 20 may be provided and arranged at positions in the right-left direction of the seating part 10. An anchor 30 to which a child safety seat is anchored is provided within the opening 20. The method for anchoring the child safety seat to the anchor 30 is as specified by the ISO-FIX international standards.

The seat back 11 is provided on the ridged part 10b of the seating part 10. The seat back 11 and the seating part 10 have a gap 40 defined therebetween and the gap 40 extends linearly in the right-left direction. The width and shape of the gap 40 are not particularly limited, as long as a free-end portion 61 of a cover member 50 (which will be described below) can be inserted and held in the gap.

Figure 3:
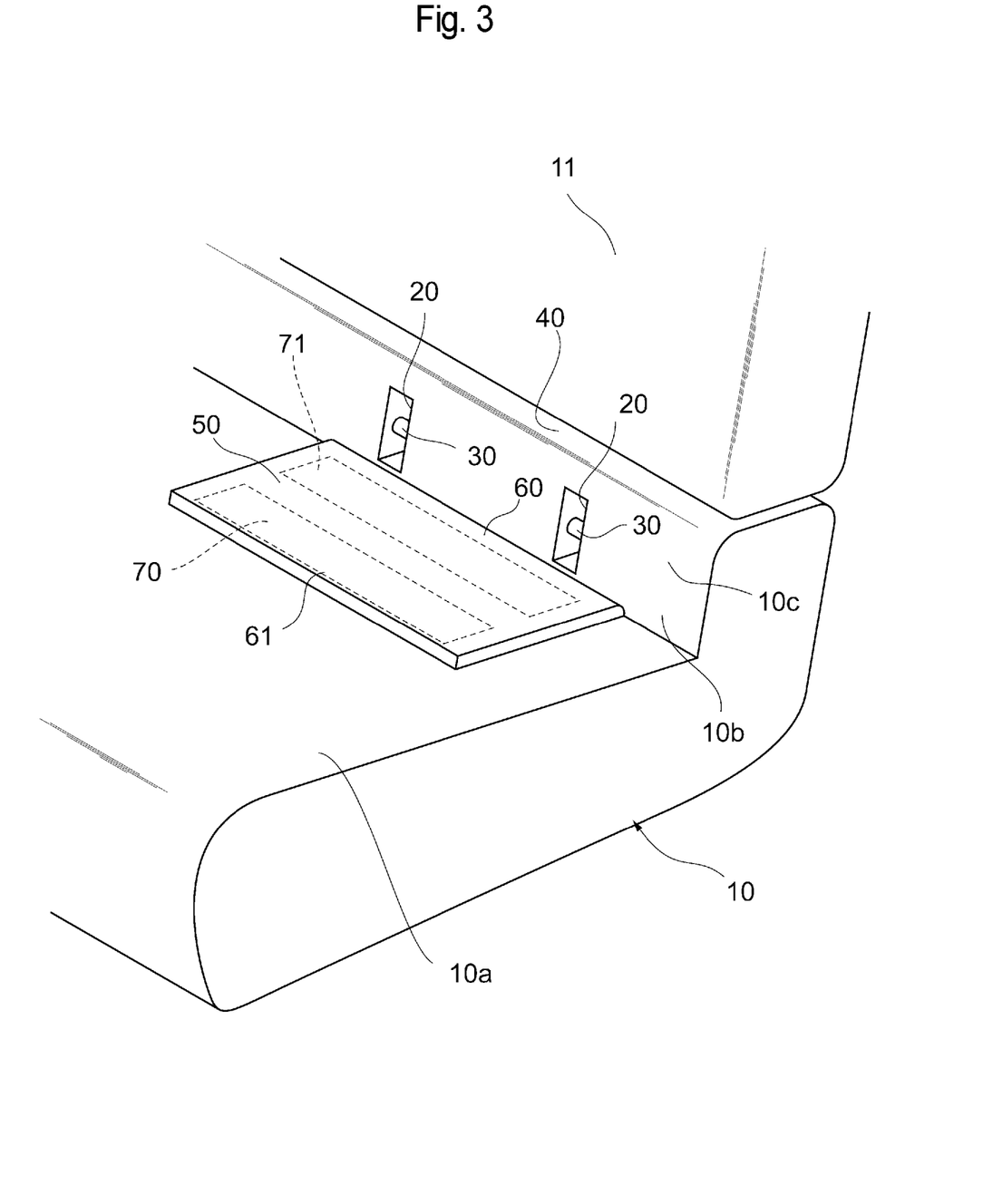
FIG. 3 is an illustration for explaining the structure around openings formed in a vehicle seat.
Figure 4:
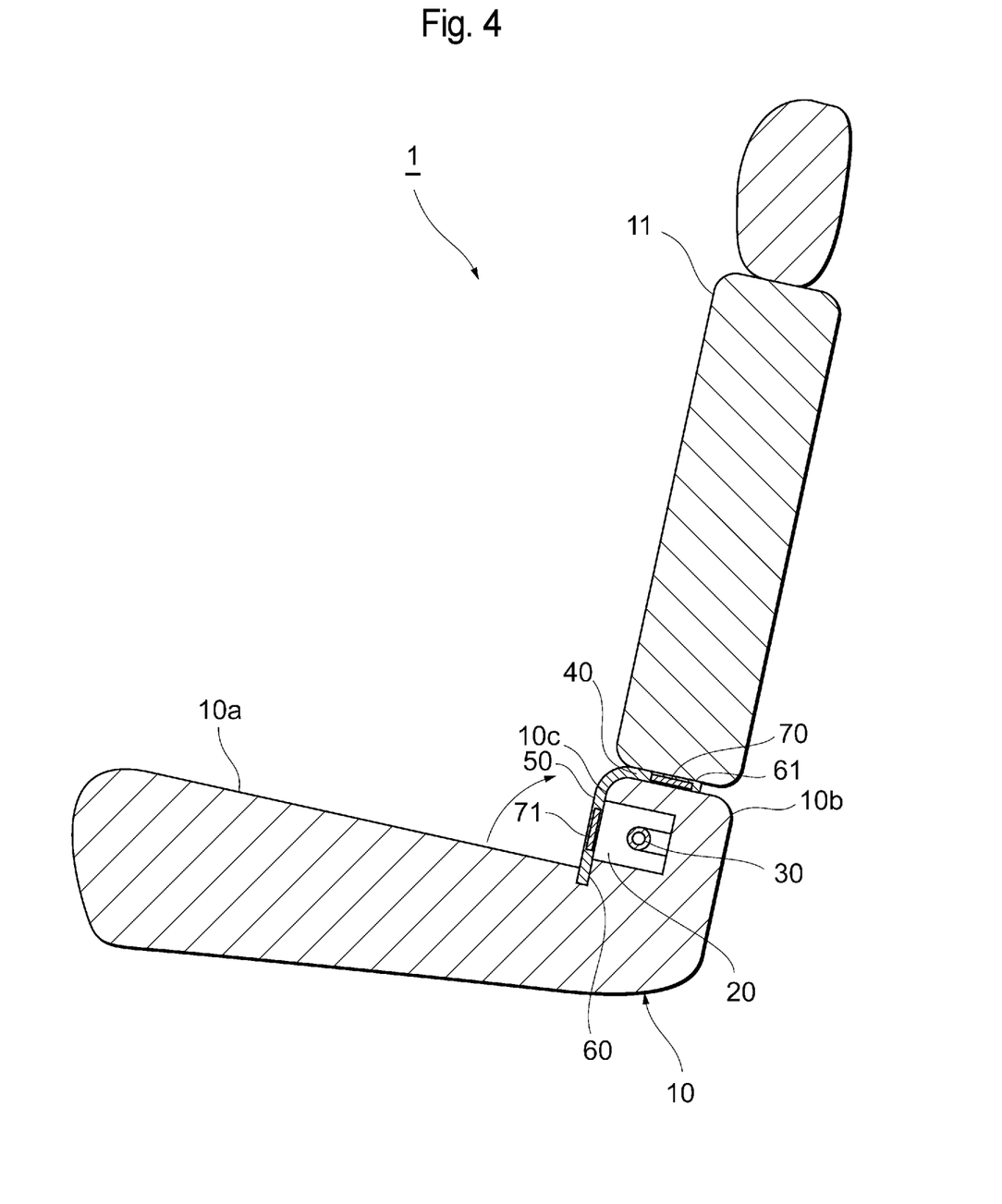
FIG. 4 is a schematic side view of a vehicle seat, illustrating the internal structure of the vehicle seat when openings are covered by a cover member.
Figure 5:
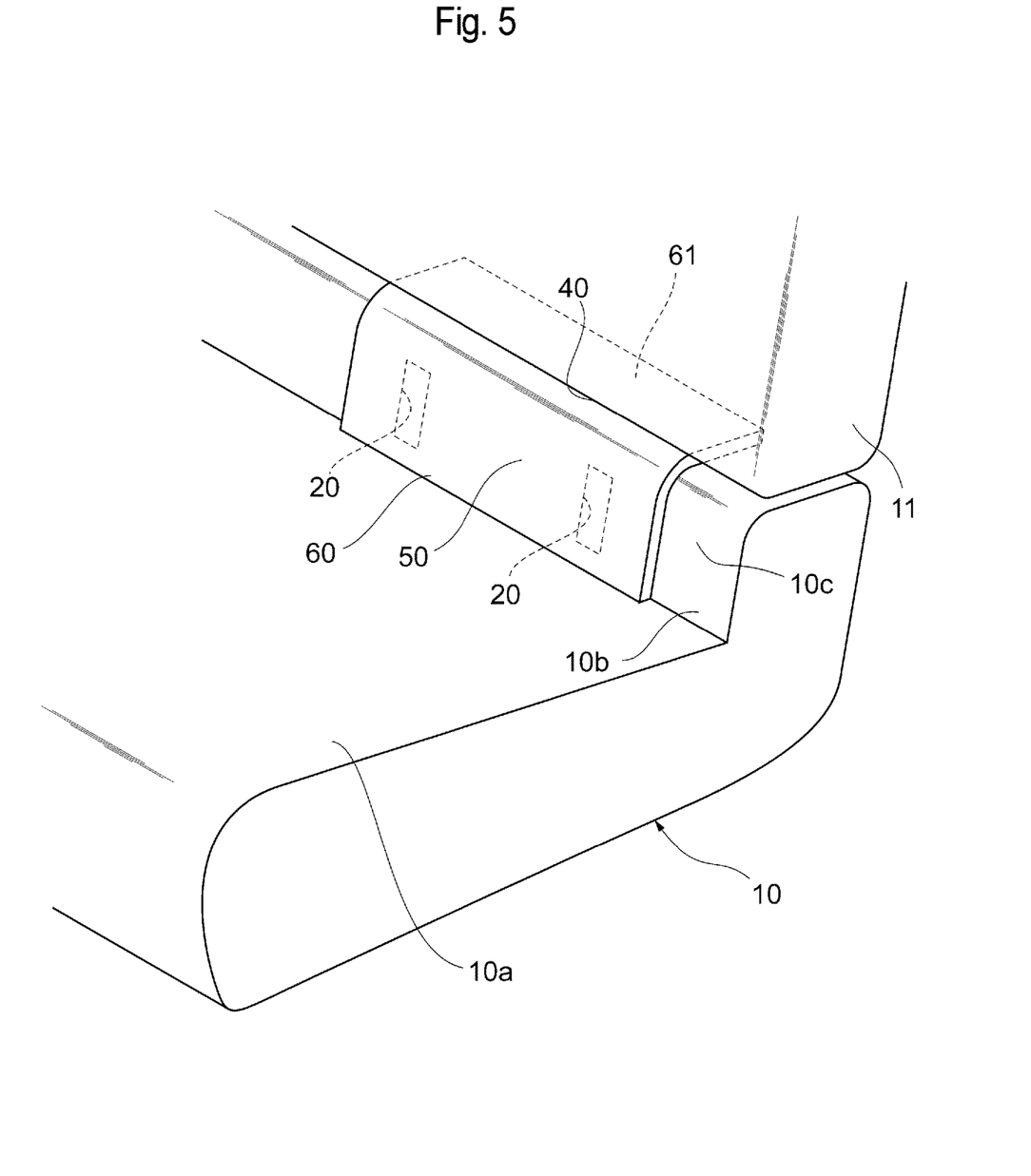
FIG. 5 is an illustration for explaining the structure around openings formed in a vehicle seat when the openings are covered by a cover member.

As illustrated in FIGS. 1 and 3, a cover member 50 is provided on the flat part 10a of the seating part 10, such that the openings 20 can be covered with the cover member 50. The cover member 50 has a rectangular, plate-like shape. As can be seen from FIGS. 2 and 3, an end portion (base-end portion) 60 of the cover member 50 is fixed to the base of the ridged part 10b (or the seat wall 10c) of the seating part 10, by means of sewing, etc. Another end portion 61 of the cover member 50 which is opposite to the base-end portion 60 is a free end and is not fixed (i.e., the end portion 61 is a free-end portion). With this configuration, the cover member 50 can pivot back and forth about the base-end portion 60. When the cover member 50 pivots backward, this allows the free-end portion 61 to be inserted into the gap 40 so as to cover the openings 20, as illustrated in FIGS. 4 and 5. When the cover member 50 pivots forward, the cover member 50 is laid on the surface of the seating part 10 so that the openings 20 are uncovered, as illustrated in FIGS. 2 and 3.

The cover member 50 may, for example, be made of fabric and formed by sewing a front surface layer and a back surface layer together. The cover member 50 may have two hard plates 70 and 71, each having, for example, a rectangular shape and being installed within the cover member 50.

The material used for the hard plates 70 and 71 at least needs to be hard (rigid) and less likely to bend than the fabric used for the front and back surface layers, and it may be a resin or a metal. The hard plates 70 and 71 are each fixed to the body of the cover member 50 by means of sewing, etc.

The hard plate (first hard plate) 70 and the hard plate (second hard plate) 71 may be made of the same material, or may be made of different materials. Furthermore, the first hard plate 70 may be harder (more rigid) than the second hard plate 71.

The first hard plate 70 is arranged at the free-end portion 61 of the cover member 50. With this first hard plate 70, the free-end portion 61 of the cover member 50 becomes hard, making it easier to insert the free-end portion 61 into the gap 40. The first hard plate 70 is placed so as to extend from the free end of the cover member 50 and to cover a portion of almost one fourth, preferably about one fifth, of the entire width of the cover member 50 in the front-back direction. The first hard plate 70 may have a width of about two to five centimeters in the front-back direction of the cover member 50. In this embodiment, the free-end portion 61 of the cover member 50 refers to a portion where the first hard plate 70 is provided.

Figure 6:
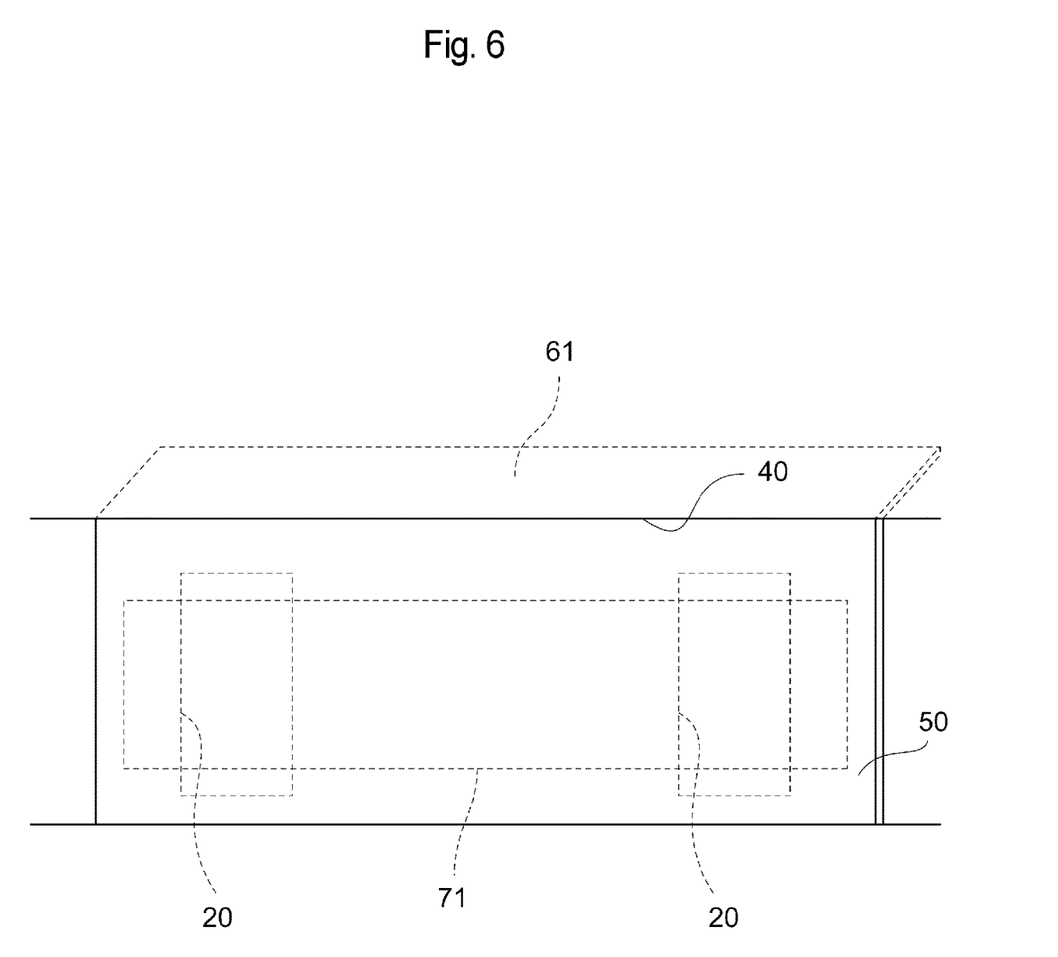
FIG. 6 is an illustration for explaining the position of a second hard plate.

The second hard plate 71 is arranged on the side of the base-end portion 60, as compared to the first hard plate 70. As shown in FIG. 6, the second hard plate 71 is provided so as to be in a position corresponding to the positions of the openings 20 when the free-end portion 61 of the cover member 50 is inserted into the gap 40. The width of the second hard plate 71 is, for example, equal to or greater than half of the vertical dimension of the opening 20. The width is preferably equal to or greater than two thirds of the vertical dimension of the opening 20, and more preferably equal to or greater than the vertical dimension of the opening 20. The width of the second hard plate 71 in the front-back direction may be greater than that of the first hard plate 70, or may be the same as the first hard plate 70. The second hard plate 71 may have a longitudinal dimension to completely cover the two openings 20, or to partly cover the two openings 20.

Next, a description will be given as to how to use the vehicle seat 1 having the above-described configuration. As illustrated in FIGS. 4 and 5, the free-end portion 61 of the cover member 50 is inserted into the gap 40 between the seating part 10 and the seat back 11 when a child safety seat is not used, so that the cover member 50 is raised to cover the openings 20. In this state, the position of the second hard plate 71 corresponds to the positions of the openings 20.

When using a child safety seat, the free-end portion 61 of the cover member 50 is taken out from the gap 40 and the cover member 50 is laid toward the front side of the seating part 10, so as to uncover the openings 20, as illustrated in FIGS. 2 and 3. In this state, the cover member 10 is placed flatly on the seating surface of the seating part 10.

Figure 7:
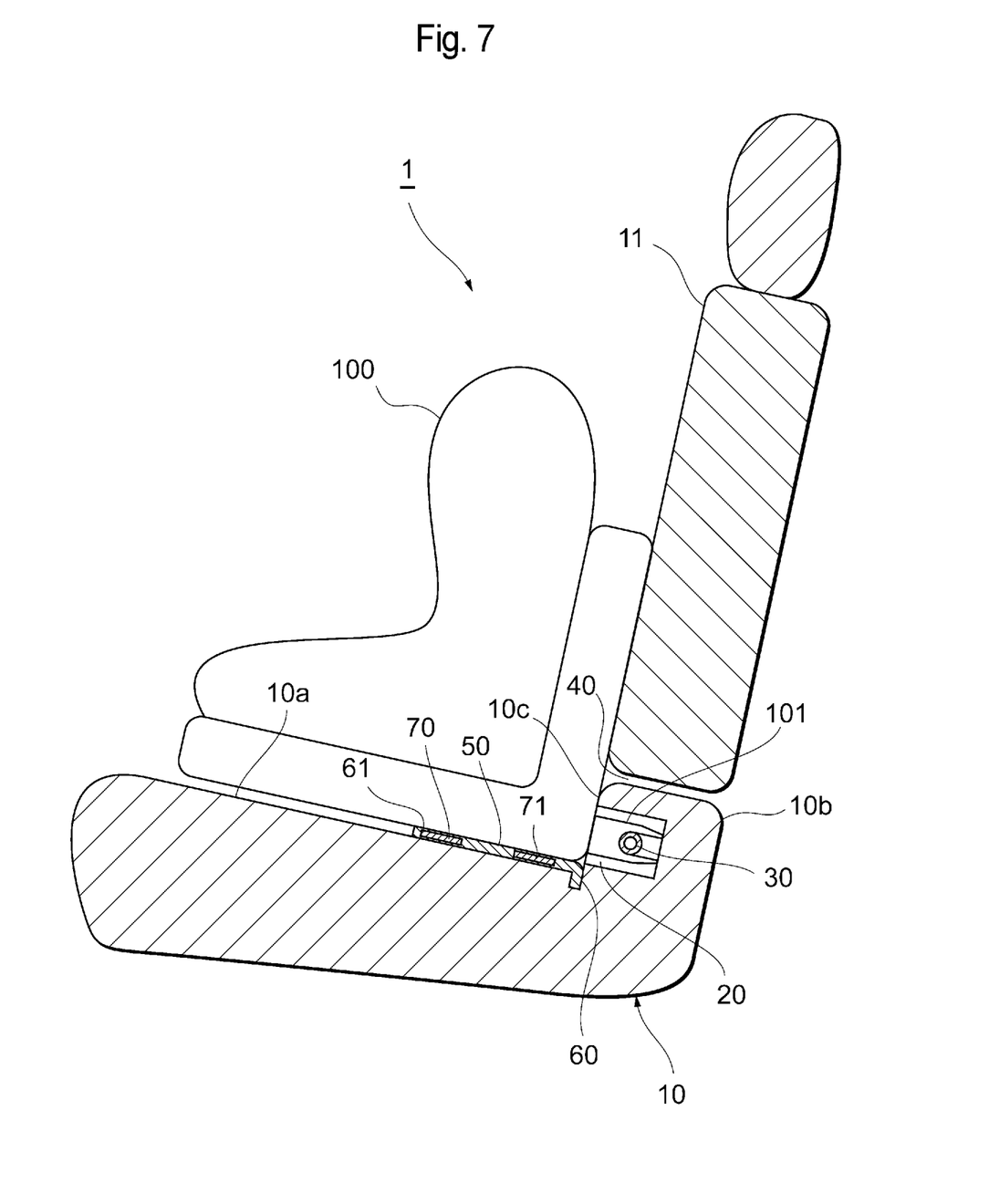
FIG. 7 is a schematic side view of a vehicle seat, illustrating the internal structure of the vehicle seat when a child safety seat is attached thereto.

Then, as shown in FIG. 7, a fixation part 101 of a child safety seat 100 is inserted into the opening 20, where the fixation part 110 is fixed to the anchor 30.

According to this embodiment, the first hard plate 70 provided in the free-end portion 61 of the cover member 50 enables the cover member 50 to be maintained flatly on the seating surface of the seating part 10, by preventing or reducing a turning-up or a bend that would otherwise occur in the edge of the cover member 50. As a result, the cover member 50 does not interfere with the process of inserting the fixation part 110 of the child safety seat 100 into the opening 20, thereby leading to an improvement in the attachment of the child safety seat 100. Moreover, the first hard plate 70 provided in the free-end portion 61 of the cover member 50 also facilitates the free-end portion 61 to be inserted securely into the end of the gap 40 between the seating part 10 and the seat back 11, and this leads to improvements in the storage and handling of the free-end portion 61 of the cover member 50.

The base-end portion 60 of the cover member 50 is fixed to the seating part 10 at a position forward of the openings 20, and the cover member 50 covers the openings 20 when the free-end portion 61 is inserted into the gap 40 between the seating part 10 and the seat back 11, while uncovering the openings 20 when the free-end portion 61 is taken out from the gap and the cover member 50 is laid toward the front side of the vehicle seat 1. In other words, the openings 20 can be covered and uncovered by inserting the hard free-end portion 61 of the cover member 50 into the gap 40 and taking it out from the gap 40, which facilitates the operation of opening and closing the openings 20 with the cover member 50.

The second hard plate 71 is provided in the base-end portion 60 of the cover member 50, and such second hard plate 71 enables the cover member 50 to be maintained further flatly on the seating part 10 when the cover member 50 is laid on the seating part 10.

The second hard plate 71 is provided so as to correspond to the positions of the openings 20 when the free-end portion 61 is inserted into the gap 40 between the seating part 10 and the seat back 11. Such second hard plate 71 prevents or reduces the formation of a dent at a portion of the cover member 50 covering the opening 20 when such portion is pressed by the seated person from the front. As a result, the seated person can comfortably sit on the vehicle seat 1.

Figure 8:
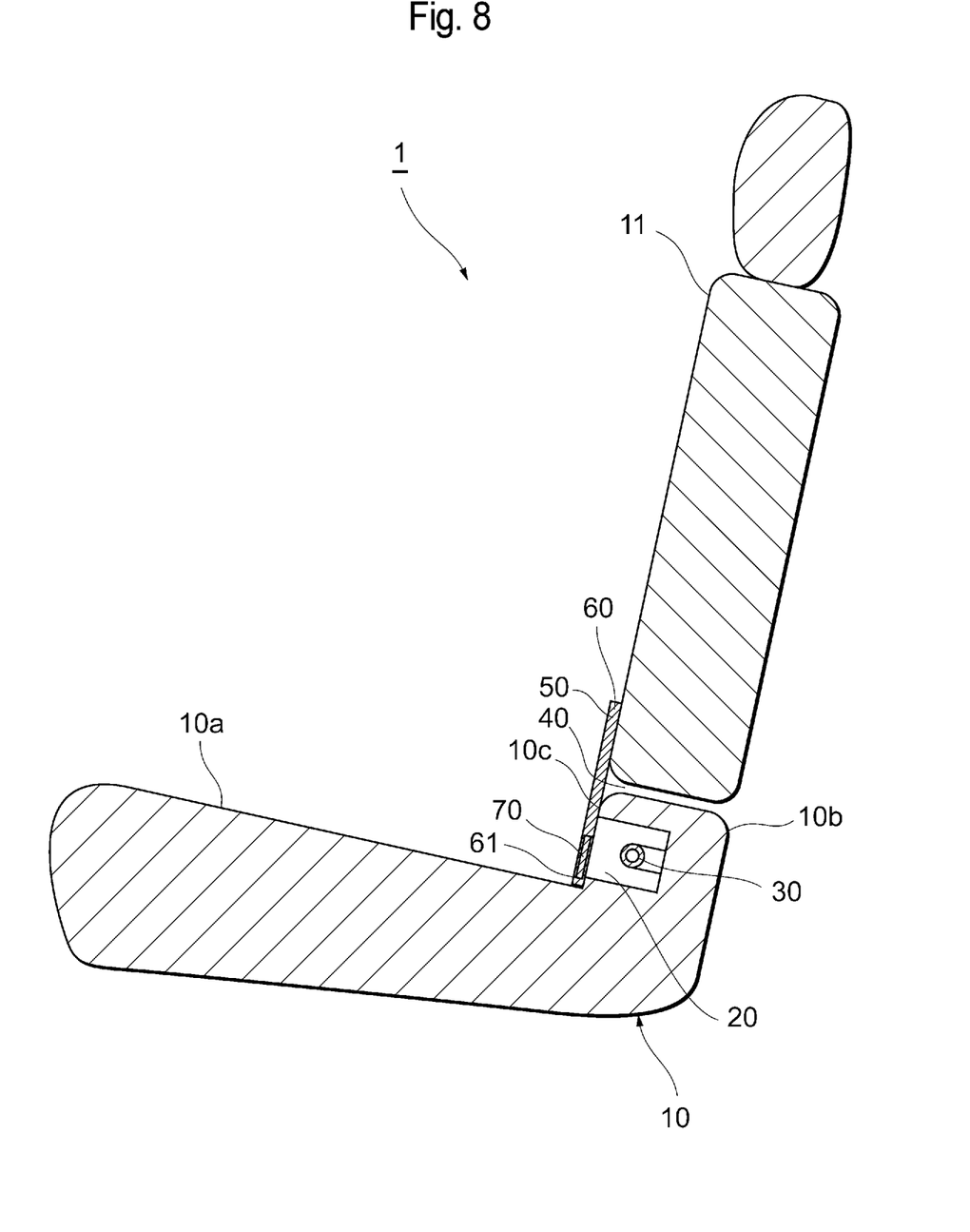
FIG. 8 is a schematic side view of a vehicle seat, illustrating the internal structure of the vehicle seat when a cover member is fixed to the seat back.
Figure 9:
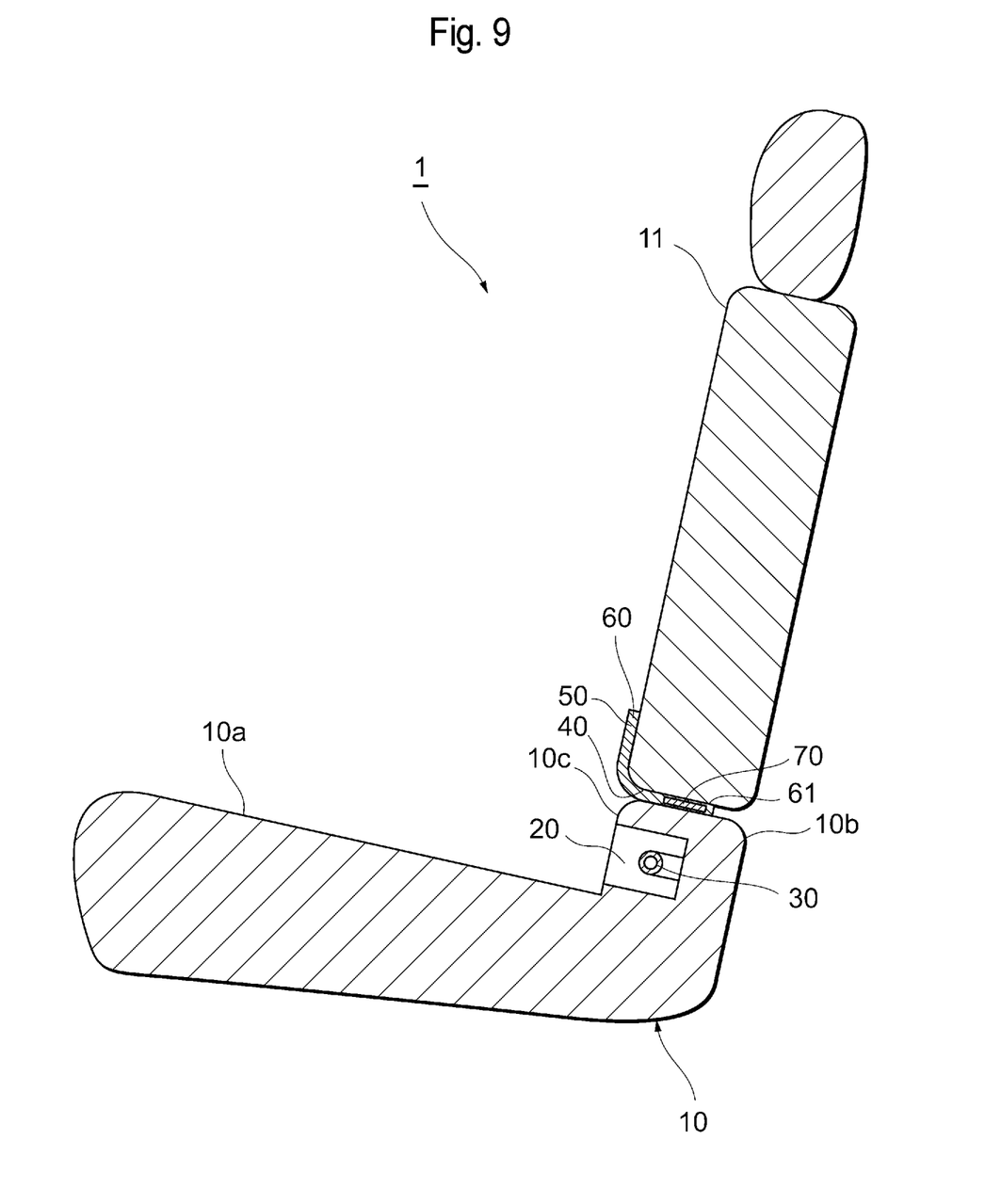
FIG. 9 is a schematic side view of a vehicle seat, illustrating the internal structure of the vehicle seat when a free-end portion of a cover member is inserted into a gap.

The above embodiment has described an example in which the cover member 50 is fixed to the seating part 10, but the cover member 50 may also be fixed to the seat back 11. In this configuration, for example, the base-end portion 60 of the cover member 50 is fixed to the seat back 11 side at a portion above the gap 40 between the seating part 10 and the seat back 11, while the free-end portion 61 hangs down, as illustrated in FIG. 8. The cover member 50 covers the openings 20 when the free-end portion 61 hangs down toward the openings 20. In this state, the position of the hard plate 70 of the cover member 50 corresponds to the positions of the openings 20. Further, the openings 20 are uncovered when the free-end portion 61 is inserted into the gap 40 between the seating part 10 and the seat back 11, as illustrated in FIG. 9. It should be noted here that the second hard plate 71 may be optional in this embodiment (second embodiment), and other configurations in this second embodiment may, for example, be the same as those of the above-described embodiment.

The second embodiment above is configured such that: the cover member 50 is fixed to the seat back 11 side; the first hard plate 70 is provided to the free-end portion 61 of the cover member 50 and the free-end portion 61 is arranged so as to hang down; and, when a child safety seat is in use, the free-end portion 61 is inserted into the gap 40 so as to uncover the openings 20. Accordingly, the cover member 50 does not interfere with the process of inserting the fixation part 110 of a child safety seat 100, thereby leading to an improvement in the attachment of the child safety seat 100. Moreover, the first hard plate 70 provided in the free-end portion 61 of the cover member 50 facilitates secure insertion of the free-end portion 61 into the end of the gap 40 between the seating part 10 and the seat back 11, and this leads to improvements in the storage and handling of the free-end portion 61 of the cover member 50.

Figure 10:
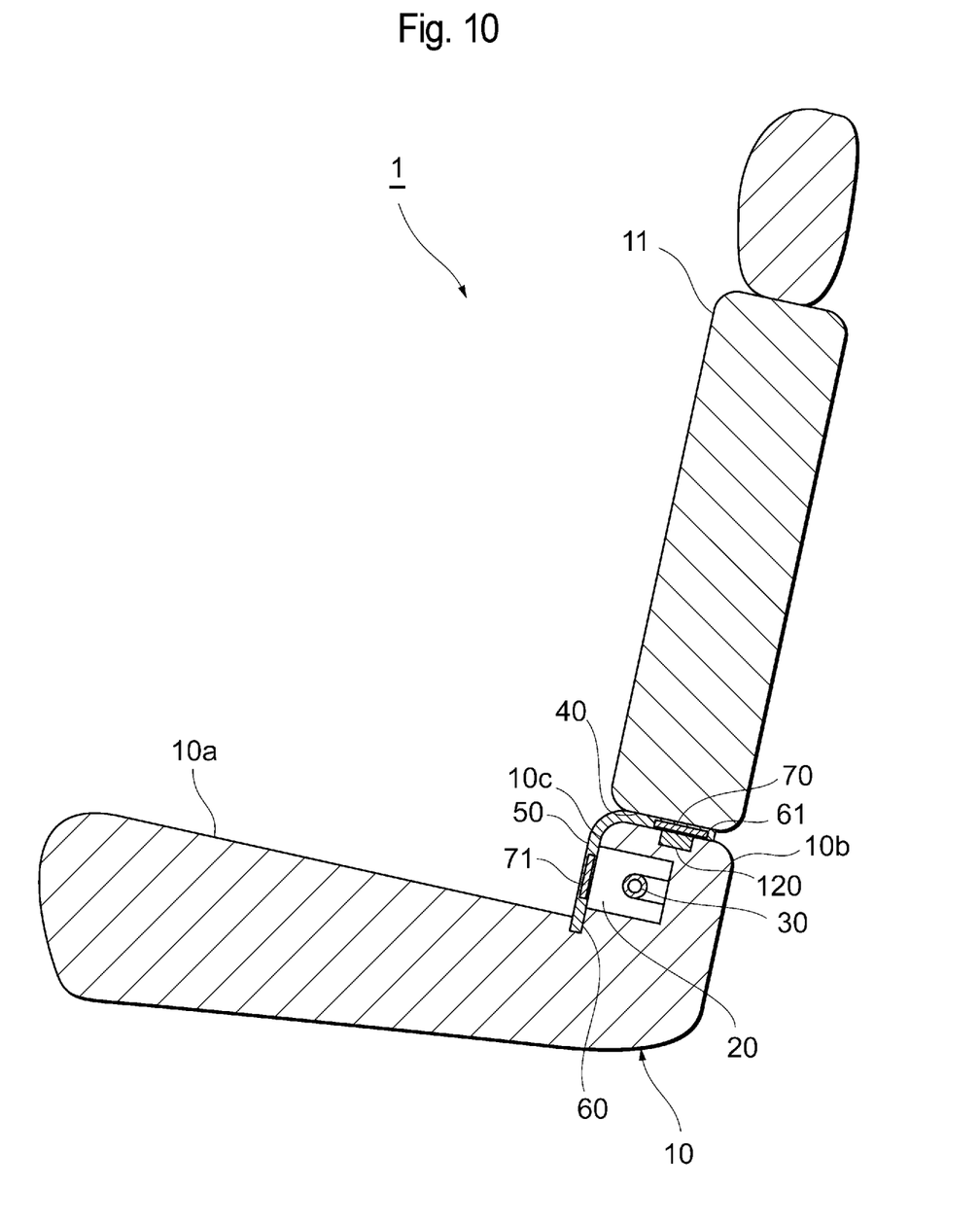
FIG. 10 is a schematic side view of a vehicle seat, illustrating the internal structure of the vehicle seat when a magnet is provided in a gap between the seating part and seat back of the vehicle seat.

When the hard plate 70 is made of metal in the above-described embodiments, a magnet 120 may be placed in the gap 40 between the seating part 10 and the seat back 11, as shown in FIG. 10, so that the hard plate 70 can be attached to and detached from the magnet 120. Such magnet 120 enables the positioning of the free-end portion 61 and accordingly improves the handling of the cover member 50.

Preferred embodiments of the present invention have been described above by referring to the attached drawings; however, the present invention is not limited to the described examples. A person skilled in the art would obviously be able to think of various other modifications and alterations without departing from the range of the idea specified in the scope of the claims. It should be appreciated that such modifications and alterations would obviously be included in the technical scope of the present invention.

For example, the cover member in the above-described embodiments is configured to cover two openings 20, but the cover member may instead be configured to cover one opening 20. In that case, a cover member is provided for each of the two openings 20. The portion of the cover member in which a hard plate is provided is not limited to the free-end portion, and a hard plate may also be provided in another portion of the cover member. Such hard plate provided in another portion of the cover member may be formed integrally with, or separately from, the hard plate provided in the free-end portion of the cover member. In addition, the cover member may have two or more hard plates provided in other portions.

The present invention is useful for providing a vehicle seat that is capable of improving the attachment of a child safety seat to the vehicle seat.

According to the present invention, a vehicle seat is obtained which improves the attachment of a child safety seat to the vehicle seat.

What is claimed is:

1. A vehicle seat comprising:
   a seating part;
   a seat back, wherein the seating part and the seat back define a gap therebetween, the gap being formed on a front face of the vehicle seat, and wherein a recessed opening is formed on the front face of the seating part, the recessed opening having an anchor configured to anchor a child safety seat; and
   a flat cover member provided on the front face of the vehicle seat and is capable of covering the opening,
   wherein the cover member has a base-end portion that is fixed to the vehicle seat and a free-end portion that is not fixed to the vehicle seat and can be freely inserted into the gap between the seating part and the seat back,
   a first hard plate is provided in the free-end portion of the cover member, and can be freely put in and out of the gap between the seating part,
   a second hard plate is provided in the base-end portion of the cover member, and is at a position corresponding to the opening when the first hard plate is inserted into the gap between the seating part and the seat back;
   the cover member has a front surface layer and a back surface layer,
   the first hard plate and the second hard plate are disposed between the front surface layer and the back surface layer, and
   the first hard plate and the second hard plate are made of a resin or a metal having higher rigidity than the front surface layer and the back surface layer.

2. The vehicle seat according to claim 1, wherein:
   the base-end portion of the cover member is fixed to the seating part at a portion forward of the opening; and
   the opening is configured to be covered with the cover member when the free-end portion is inserted into the gap between the seating part and the seat back, and configured to be uncovered when the free-end portion is taken out from the gap and the cover member is laid forward on the vehicle seat.

3. The vehicle seat according to claim 1, wherein:
the base-end portion of the cover member is fixed to the seat back at a portion above the gap between the seating part and the seat back; and
the opening is configured to be uncovered when the free-end portion is inserted into the gap between the seating part and the seat back, and configured to be covered with the cover member when the free-end portion is taken out from the gap and hangs down toward the opening.

4. The vehicle seat according to claim 3, wherein the hard plate is provided so as be placed at a position corresponding to the opening when the free-end portion hangs down toward the opening.

5. The vehicle seat according to claim 1, wherein:
the hard plate is made of metal; and
a magnet is placed in the gap between the seating part and the seat back so that the hard plate can be attached to and detached from the magnet.

6. A vehicle seat comprising:
a seating part;
a seat back, wherein the seating part and the seat back define a gap therebetween, the gap being formed on a front face of the vehicle seat, and wherein a recessed opening is formed on the front face of the seating part, the recessed opening having an anchor configured to anchor a child safety seat; and
a flat cover member that is provided on the front face of the vehicle seat and is capable of covering the opening,
wherein the cover member has a base-end portion that is fixed to the vehicle seat and a free-end portion that is not fixed to the vehicle seat and can be freely inserted into the gap between the seating part and the seat back,
a first hard plate is provided in the free-end portion of the cover member, and can be freely put in and out of the gap between the seating part,
a second hard plate is provided in the base-end portion of the cover member, and is at a position corresponding to the opening when the first hard plate is inserted into the gap between the seating part and the seat back;
the cover member has a front surface layer and a back surface layer,
the first hard plate and the second hard plate are disposed between the front surface layer and the back surface layer,
the first hard plate and the second hard plate are made of a resin or a metal having higher rigidity than the front surface layer and the back surface layer, and
the first hard plate and the second hard plate have a rectangular shape extending across both ends in the left-right direction of the cover member, and has a length of ¼ or less of the length in the front-rear direction of the cover member.

7. A vehicle seat comprising:
a seating part;
a seat back, wherein the seating part and the seat back define a gap therebetween, the gap being formed on a front face of the vehicle seat, and wherein a recessed opening is formed on the front face of the seating part, the recessed opening having an anchor configured to anchor a child safety seat; and
a flat cover member that is provided on the front face of the vehicle seat and is capable of covering the opening,
wherein the cover member has a base-end portion that is fixed to the vehicle seat and a free-end portion that is not fixed to the vehicle seat and can be freely inserted into the gap between the seating part and the seat back,
a first hard plate is provided in the free-end portion of the cover member, and can be freely put in and out of the gap between the seating part,
a second hard plate is provided in the base-end portion of the cover member;
the cover member has a front surface layer and a back surface layer,
the first hard plate and the second hard plate are installed within the front surface layer and the back surface layer,
the first hard plate and the second hard plate are made of a resin or a metal having higher rigidity than the front surface layer and the back surface layer,
the base-end portion of the cover member is fixed to the seating part at a portion forward of the opening,
the opening is configured to be covered with the cover member when the free-end portion is inserted into the gap between the seating part and the seat back, and configured to be uncovered when the free-end portion is taken out from the gap and the cover member is laid forward on the vehicle seat,
the second hard plate is at a position corresponding to the opening when the free-end portion is inserted into the gap between the seating part and the seat back, and
the second hard plate has a width equal to or larger than a vertical dimension of the opening.

* * * * *